(12) United States Patent
Mouri et al.

(10) Patent No.: US 10,101,580 B2
(45) Date of Patent: Oct. 16, 2018

(54) VEHICLE HEADLAMP

(71) Applicants: Fumihiko Mouri, Owariasahi (JP);
Yusuke Nakada, Shizuoka (JP);
Yoshiyuki Nakanishi, Shizuoka (JP)

(72) Inventors: Fumihiko Mouri, Owariasahi (JP);
Yusuke Nakada, Shizuoka (JP);
Yoshiyuki Nakanishi, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 0 days.

(21) Appl. No.: 15/363,655

(22) Filed: Nov. 29, 2016

(65) Prior Publication Data

US 2017/0160542 A1   Jun. 8, 2017

(30) Foreign Application Priority Data

Dec. 8, 2015   (JP) .................................. 2015-239432

(51) Int. Cl.
| | |
|---|---|
| F21S 8/10 | (2006.01) |
| F21V 29/503 | (2015.01) |
| F21V 29/67 | (2015.01) |
| F21V 29/70 | (2015.01) |
| G02B 26/08 | (2006.01) |
| G02B 27/00 | (2006.01) |
| F21S 41/36 | (2018.01) |
| F21S 41/675 | (2018.01) |
| F21S 45/43 | (2018.01) |

(Continued)

(52) U.S. Cl.
CPC .......... G02B 27/0006 (2013.01); F21S 41/36 (2018.01); F21S 41/675 (2018.01); F21S 45/43 (2018.01); F21V 29/503 (2015.01); F21V 29/673 (2015.01); F21V 29/70 (2015.01); G02B 26/0833 (2013.01); *F21S 41/255* (2018.01); *F21S 41/365* (2018.01)

(58) Field of Classification Search
CPC ........................ G02B 26/0833; G02B 27/0006
See application file for complete search history.

(56) References Cited

U.S. PATENT DOCUMENTS

| | | | |
|---|---|---|---|
| 2009/0154189 A1* | 6/2009 | Cho ..................... | F21S 48/1159 362/547 |
| 2011/0280033 A1* | 11/2011 | Kishimoto ........... | F21S 48/1145 362/543 |

(Continued)

FOREIGN PATENT DOCUMENTS

| | | |
|---|---|---|
| DE | 699 29 622 T2 | 9/2006 |
| DE | 10 2010 028 949 A1 | 11/2011 |

(Continued)

*Primary Examiner* — Alexander Garlen
(74) *Attorney, Agent, or Firm* — Oblon, McClelland, Maier & Neustadt, L.L.P.

(57) ABSTRACT

A vehicle headlamp is provided including a road surface pattern-rendering unit and a dust removal device. The road surface pattern-rendering unit is installed to a headlamp unit provided to a front end section of a vehicle, and forms a specific light distribution pattern by causing light shone from a light source to be reflected by a MEMS mirror toward a vehicle front side. The dust removal device is provided to the headlamp unit and removes dust adhering to the MEMS mirror.

9 Claims, 3 Drawing Sheets

(51) Int. Cl.
*F21S 41/255* (2018.01)
*F21S 41/365* (2018.01)

(56) References Cited

U.S. PATENT DOCUMENTS

| | | | |
|---|---|---|---|
| 2012/0092885 A1* | 4/2012 | Hong | F21S 48/335 |
| | | | 362/547 |
| 2013/0058114 A1* | 3/2013 | Reiners | F21S 48/1136 |
| | | | 362/510 |
| 2014/0140085 A1* | 5/2014 | Matsumoto | F21S 48/1159 |
| | | | 362/516 |
| 2015/0092435 A1 | 4/2015 | Yamamura et al. | |
| 2015/0211703 A1 | 7/2015 | Nakazawa et al. | |
| 2015/0334277 A1* | 11/2015 | Liu | H04N 5/2252 |
| | | | 348/374 |
| 2016/0170203 A1* | 6/2016 | Weigert | G02B 27/0006 |
| | | | 134/1 |

FOREIGN PATENT DOCUMENTS

| | | |
|---|---|---|
| DE | 10 2014 219 799 A1 | 4/2015 |
| JP | 2005-141065 A | 6/2005 |
| JP | 2014-102988 A | 6/2014 |
| JP | 2015-72765 | 4/2015 |
| JP | 2015-138763 | 7/2015 |

* cited by examiner

VEHICLE HEADLAMP

CROSS-REFERENCE TO RELATED APPLICATION

This application is based on and claims priority under 35 USC 119 from Japanese Patent Application No. 2015-239432 filed on Dec. 8, 2015, the disclosure of which is incorporated by reference herein.

BACKGROUND

Technical Field

The present disclosure relates to a vehicle headlamp.

Related Art

In the vehicular lamp described in Japanese Patent Application Laid-Open (JP-A) No. 2015-138763 (Patent Document 1), a specific light distribution pattern is formed by a two-dimensional image display device. The two-dimensional image display device (MEMS mirror) includes a display section and a transparent member that is disposed separated from the display section on the side of a projection lens. The transparent member can accordingly prevent dust from adhering directly to the display section of the two-dimensional image display device.

However, in the vehicular lamp above, although the transparent member can prevent dust from adhering directly to the display section of the two-dimensional image display device, dust adheres to the transparent member itself. Light shone from a light source or light reflected by the display section accordingly strikes the dust that has adhered to the transparent member, thereby scattering the light that otherwise should have been shone toward the projection lens. Thus, due to the influence of dust, it is sometimes not possible to achieve excellent light distribution pattern formation.

SUMMARY

In consideration of the above, an object of the present disclosure is to provide a vehicle headlamp able to achieve excellent light distribution pattern formation.

A vehicle headlamp according to a first aspect of the present disclosure includes a road surface pattern-rendering unit that is installed to a headlamp unit provided to a front end section of a vehicle, and that forms a specific light distribution pattern by causing a MEMS mirror to reflect light shone from a light source toward a vehicle front side, and a dust removal device that is provided to the headlamp unit and that removes dust adhering to the MEMS mirror.

In the vehicle headlamp according to the first aspect, the road surface pattern-rendering unit is installed to the headlamp unit provided to the front end section of the vehicle. The road surface pattern-rendering unit forms a specific light distribution pattern by causing the MEMS mirror to reflect light shone from the light source toward the vehicle front side.

The dust removal device is provided to the headlamp unit. Dust adhering to the MEMS mirror is removed by the dust removal device. Accordingly, even if dust were to adhere to the MEMS mirror, since the dust is removed by the dust removal device, excellent light distribution pattern formation can be achieved by the road surface pattern-rendering unit.

A vehicle headlamp according, to a second aspect is the first aspect, wherein the dust removal device is configured by an air blower, and the air blower blows air from a side of the MEMS mirror toward the MEMS mirror.

In the vehicle headlamp according to the second aspect, the dust removal device is configured by the air blower. The air blower blows air toward the MEMS mirror. Thus, even if dust were to adhere to the MEMS mirror, the dust is removed by air blown by the air blower. Accordingly since scattering of light reflected by the MEMS mirror is suppressed, excellent light distribution pattern formation can be achieved by the road surface pattern-rendering unit.

Moreover, the air blower blows air from the side of the MEMS mirror toward the MEMS mirror. Thus, dust that has adhered to the MEMS mirror can be removed by air blown across the MEMS mirror by the air blower, without disposing the air blower at the vehicle front side of the MEMS mirror. Dust can accordingly be removed without the air blower obstructing the path of the light reflected by the MEMS mirror.

A vehicle headlamp according to a third aspect is the second aspect, wherein the road surface pattern-rendering unit includes a light source unit configured including a light source and a heatsink holding the light source. The light source unit is disposed in a direction air is blown from the air blower so as to face the air blower.

In the vehicle headlamp, according to the third aspect, air blown by the air blower can be made to hit the light source unit. The light source unit can accordingly be cooled by utilizing air blown by the air blower.

The vehicle headlamp according to a fourth aspect is the first aspect, wherein the MEMS mirror is configured including a mirror main body that reflects light shone from the light source, and a transparent cover that covers the mirror main body from the vehicle front side. The dust removal device is configured by a vibrator that causes the cover to vibrate.

In the vehicle headlamp according to the fourth aspect, dust can be prevented from adhering directly to the mirror main body using the cover. Moreover, the vibrator causes the cover to vibrate such that dust that has adhered to the cover is knocked down from the cover. Dust that has adhered to the cover can accordingly be removed from the cover.

A vehicle headlamp according, to a fifth aspect is the fourth aspect, wherein an upper end portion of the cover is coupled to the vibrator.

In the vehicle headlamp according to the fifth aspect, dust that has adhered to the cover can be easily knocked off to below the cover. Moreover, compared to a hypothetical case in which the vibrator is disposed at a vehicle lower side of the MEMS mirror, dust can be suppressed from collecting on the vibrator.

A vehicle headlamp according to a sixth aspect is the fourth aspect or the fifth aspect, wherein the vibrator is disposed on the opposite side of the MEMS mirror to the light source.

In the vehicle headlamp according to the sixth aspect, the vibrator is disposed on the opposite side of the MEMS mirror to the light source, enabling a separation distance between the vibrator and the light source to be made comparatively longer. Thus, vibration generated by the vibrator is less liable to be transmitted the light source. This thereby enables shaking of the light shone from the light source to be suppressed.

In the vehicle headlamp according to the first aspect, excellent light distribution pattern formation can be achieved by the road surface pattern-rendering unit.

In the vehicle headlamp according to the second aspect, dust can be removed without the air blower obstructing the path of the light reflected by the MEMS mirror.

In the vehicle headlamp according to the third aspect, the light source unit can be cooled by utilizing air blown by the air blower.

In the vehicle headlamp according to the fourth aspect, dust that has adhered to the cover can be removed, while preventing dust from adhering directly to the mirror main body.

In the vehicle headlamp according to the fifth aspect, dust that has adhered to the cover can be easily knocked off to below the cover.

In the vehicle headlamp, according to the sixth aspect, shaking of the light shone from the light source can be suppressed.

BRIEF DESCRIPTION OF THE DRAWINGS

Exemplary embodiments of the present disclosure will be described in detail based on the following figures, wherein.

DESCRIPTION OF EMBODIMENTS

First Exemplary Embodiment

Figure 1:
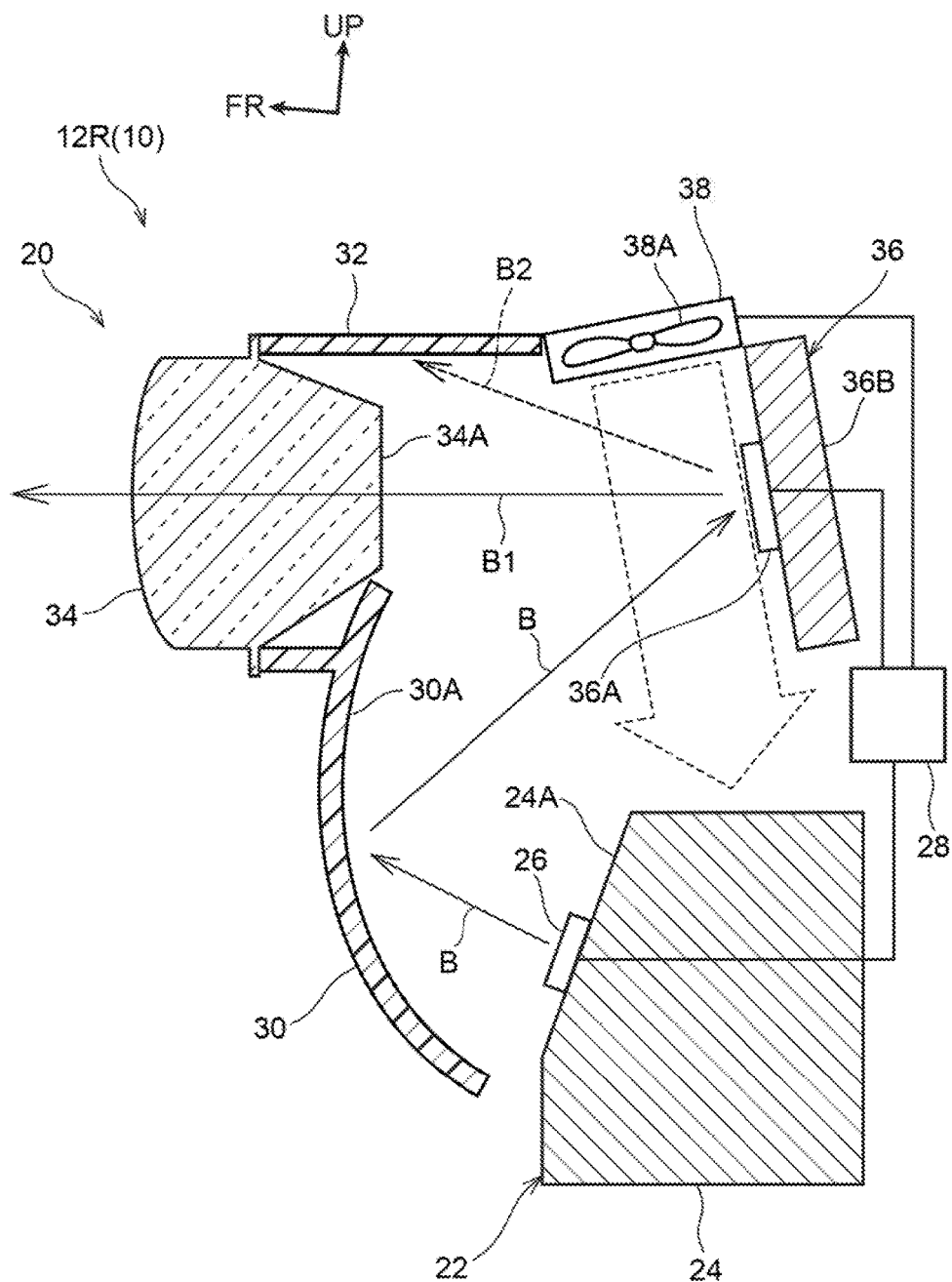
FIG. 1 is a side cross-section (cross-section taken along line 1-1 in FIG. 2) illustrating a road surface pattern-rendering unit of a vehicle headlamp according to a first exemplary embodiment, as viewed from a vehicle central side.
Figure 2:
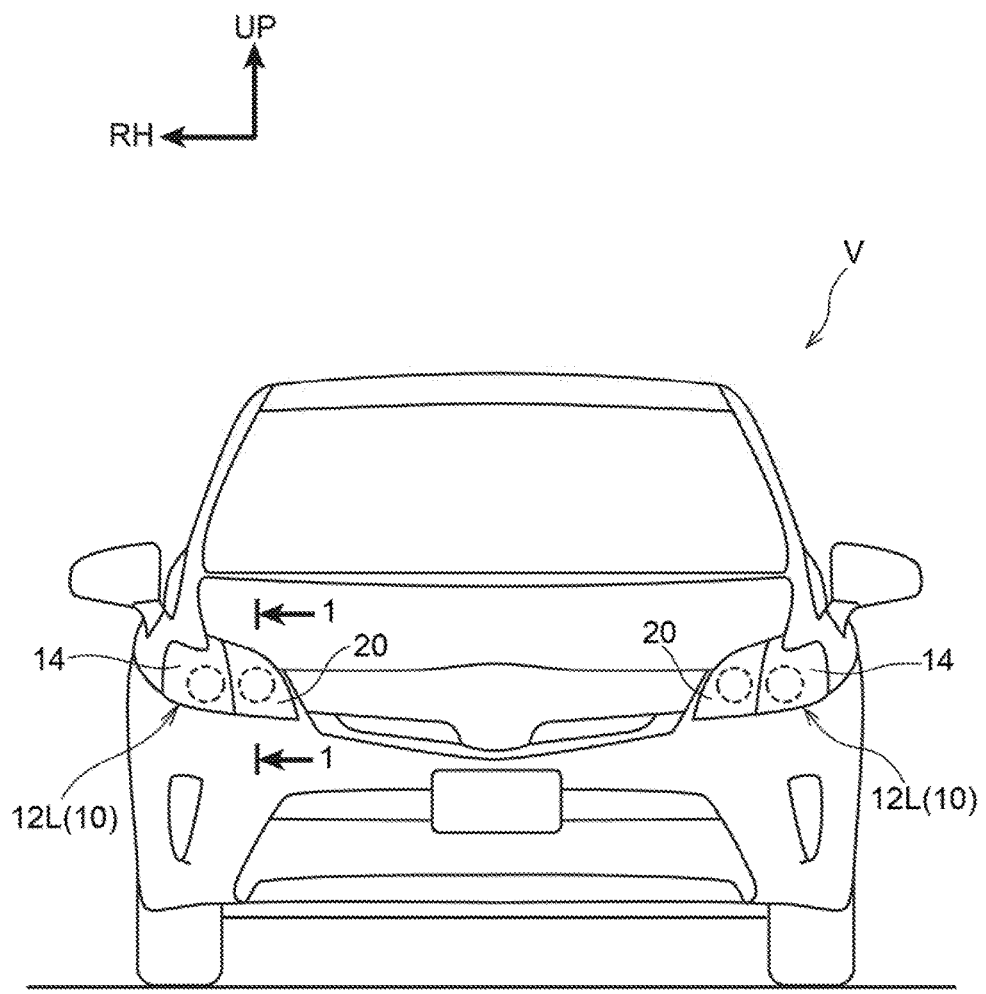
FIG. 2 is a front view illustrating a front section of a vehicle that has been applied with vehicle headlamps according to the first exemplary embodiment.

Explanation follows regarding vehicle headlamps 10 according to a first exemplary embodiment, with reference to FIG. 1 and FIG. 2. Note that the arrow UP, the arrow FR, and the arrow RH illustrated in the drawings respectively indicate, in a vehicle V that is applied with the vehicle headlamps 10, a vehicle upper side, a vehicle front side, and a vehicle right side in a state facing the direction of progress of the vehicle V. Unless specifically stated otherwise, simple reference to the vertical, front-rear, and left-right directions refers to vertical in a vehicle vertical direction, front-rear in a vehicle front-rear direction, and left-right in a vehicle left-right direction (vehicle width direction).

Vehicle Headlamps 10

As illustrated in FIG. 2, the vehicle headlamps 10 includes a left and right pair of headlamp units 12R, 12L. The headlamp unit 12R is disposed at a right end portion of a front end section of the vehicle V, and the headlamp unit 12L is disposed at a left end portion of the front end section of the vehicle V. The headlamp units 12R, 12L, are configured with left-right symmetry in the vehicle width direction. Thus, in explaining the configuration of the headlamp units 12R, 12L, explanation is given regarding the headlamp unit 12R on the right side, and explanation regarding the headlamp unit 12L on the left side is omitted.

The headlamp unit 12R is configured including a low/high beam unit 14 configuring a vehicle width direction outer portion of the headlamp unit 12R, and a road surface pattern-rendering unit 20 configuring a vehicle width direction inner portion of the headlamp unit 12R.

The low/high beam unit 14 includes a light source, not illustrated in the drawings, and the low/high beam unit 14 is configured so as to shine in front of the vehicle V using the light source. The light source is configured as a low beam light source and a high beam light source. Namely, the low/high beam unit 14 is configured capable of switching between a primary low beam that shines on a region of the road surface (low beam light distribution area) in front of the vehicle V, and a high bean shines on a region that is above the region shone on by the low beam (high beam light distribution area). Note that a light emitting diode (an LED), a halogen lamp, a discharge lamp, a semiconductor laser (laser diode: LD), or the like may be employed as the light source of the low/high beam unit 14.

As illustrated in FIG. 1, the road surface pattern-rendering unit 20 is configured as a unit that renders a specific light distribution pattern on the road surface (more specifically, the low beam light distribution area) at the front of the vehicle V. The road surface pattern-rendering unit 20 is configured including a light source unit 22, a reflector 30, a microelectromechanical system (MEMS) mirror 36, and a ventilation fan 38 serving as a "dust removal device" and as an "air blower".

The light source unit 22 is configured including heatsink 24 and a light source. The heatsink 24 configures a rear portion of the road surface pattern-rendering unit 20, is configured as a heat dissipation member for dissipating heat generated by the light source 26, described later, and is manufactured from an aluminum alloy or the like. The heatsink 24 is formed in a substantially rectangular block shape in side view, and is fixed to a housing (not illustrated in the drawings) of the headlamp unit 12R at a location not illustrated in the drawings. A holder face 24A for holding (fixing) the light, source 26, described later, is formed to an upper portion of a front face of the heatsink 24. The holder face 24A is inclined to the rear side on progression toward the upper side in side view.

The light source 26 is configured by plural high luminance light sources such as light emitting diodes, semiconductor lasers (laser diodes: LD), or the like. The light source 26 is electrically connected to a controller 28. Configuration is accordingly made in which a beam 13 having a specific color scheme is emitted from the light source 26 under control of the controller 28. The light source 26 is held (fixed) to the holder face 24A of the heatsink 24. As described above, configuration is made in which the holder face 24A is inclined toward the rear side on progression toward the upper side in side view. Thus, the beam 13 emitted from the light source 26 shines obliquely toward the upper front side, and is incident to the reflector 30, described later.

The reflector 30 is provided at the front sidelight source 26 and is formed with a plate shape curved so as to be convex toward the front side. A rear face of the reflector 30 is configured by a reflecting surface 30A, and the reflecting surface 30A is formed with a concave face shape open toward the rear. Configuration is made in which the beam B emitted from the light source 26 is reflected by the reflecting surface 30A obliquely toward the upper rear side, and the reflected beam 13 is incident to the MEMS mirror 36, described later.

A lens holder 32 for holding a lens 34 configuring a front end of the headlamp unit 12R is integrally formed to an upper side of the reflector 30. The lens holder 32 is formed in a substantially tube shape with its axial direction in the front-rear direction, and a lower portion at the front end of the lens holder 32 is joined to an upper from face of the reflector 30. A rear side portion of the lens holder 32 (a portion other than the front end) is open downward, in a configuration such that the beam B reflected by the reflector 30 described above is incident to the MEMS mirror 36, described later, without interference from the lens holder 32.

Moreover, the lens 34 is held by the lens holder 32, and the lens 34 is disposed at the front side of the MEMS mirror 36, described later. The lens 34 is held by the lens holder 32 in a state in which a rear side portion of the lens 34 is housed inside the font end portion of the lens holder 32. A front surface of the lens 34 curves spanning from a lower end to an upper end of the lens 34 so as to be convex toward the front in side view. A back surface of the lens 34 is configured by a projecting face 34A projecting out toward the rear, and the projecting face 34.A is formed in substantially a U shape open toward the front in side view. Configuration is accordingly made in which the beam B reflected toward the front side by the MEMS mirror 36, described later, is focused by the projecting face 34A, passes through the lens 34, and shines in front of the vehicle V.

The MEMS mirror 36 is provided above the light source unit 22 or more specifically, the heatsink 23) described above, and is disposed to the rear of the lens 34. The MEMS mirror 36 is configured including a mirror main body 36A and a support portion 36B that supports the mirror main body 36A. The support portion 36B is formed in a substantially cuboid shape and is held (fixed) at the upper side of the heatsink 24 by the housing (not illustrated in the drawings) of the headlamp unit 12R. The mirror main body 36A is fixed to (supported by) a front face of the support portion 36B. The mirror main body 36A is configured by plural movable micromirrors arrayed in a two dimensional pattern, and each of the plural movable micromirrors is formed on a semiconductor substrate using semiconductor fabrication processing. The controller 28 is electrically connected to the mirror main body 36A, and configuration is made in which each movable micromirror is driven under control of the controller 28. Configuration is such that when each movable micromirror is driven under control of the controller 28, the angle of the reflecting surface of the movable micromirror is modified and the movable micromirror adopts either an ON state or an OFF state. Specifically, configuration is made such that for each movable micromirror in the ON state, the beam B from the reflector 30 that is incident to the movable micromirror is reflected by the movable micromirror (this reflected light is referred to as "ON beam B1" below), and the reflected ON beam B1 shines forward from the MEMS mirror 36, and passes through the lens 34. This thereby achieves a configuration in which a specific light distribution pattern is formed by the ON beam B1 reflected by the movable micromirrors in the ON state.

On the other hand, configuration is such that for each movable micromirror of the mirror main body 36A in the OFF state, the beam B from the reflector 30 that is incident to the movable micromirror, is reflected by the movable micromirror (this reflected light is referred to as "OFF bearer B2" below), and the reflected OFF beam 132 is reflected from the mirror main body 36A obliquely toward the upper front side, and shines on the lens holder 32 described above. A configuration is thereby achieved in which the OFF beam B2 is absorbed by the lens holder 32 and does not pass through the lens 34.

The ventilation fan 38 is disposed above the mirror main body 36A and the heatsink 24, and is disposed in the front-rear direction between the support portion 36B of the MEMS mirror 36 and the lens holder 32. More specifically, the ventilation fan 38 is disposed above, and at the side of, the MEMS mirror 36 (mirror main body 36A). The ventilation fan 38 is fixed to the lens holder 32 by a bracket or the like, not illustrated in the drawings. The ventilation fan 38 is configured including a motor (not illustrated in the drawings) having a rotation shaft with its axial direction in substantially the vertical direction, and fan blades 38A fixed to the rotation shaft of the motor. Moreover, the ventilation fan 38 is electrically connected to the controller 28, and the ventilation fan 38 is configured so as to operate under control of the controller 28. Configuration is such that when the ventilation fan 38 operates under control of the controller 28, the fan blades 38A rotate about the rotation shaft, and the ventilation fan 38 blows air above the ventilation fan 38 downwards toward the mirror main body 36A and the heatsink 24 (see the arrow illustrated by dashed lines in FIG. 1). A configuration is thereby achieved such that air blown by the ventilation fan 38 hits (the movable micromirrors of) the mirror main body 36A and the heatsink 24, and removes dust adhered to (the movable micromirrors of) the mirror main body 36A. Note that in the present exemplary embodiment, operation of the ventilation fans 38 is set by the controller 28 so as to be initiated when operation of the vehicle headlamps 10 is initiated by occupant operation. Moreover, operation of the ventilation fans 38 is set by the controller 28 so as to be stopped when operation of the vehicle headlamps 10 is stopped by occupant operation. Namely, the ventilation fan 38 is set so as to run continuously during operation of the vehicle headlamps 10. The air blown by the ventilation fan 38, indicated by dashed lines, is only schematically illustrated in FIG. 1, and in the present exemplary embodiment, as described above, configuration is made such that the air blown by the ventilation fan 38 hits the mirror main body 36A.

Next, explanation follows regarding operation and advantageous effects of the present exemplary embodiment.

In the vehicle headlamps 10 configured as described above, one of the road surface pattern-rendering units 20 is provided to each of the left and right pair of headlamp units 12R, 12L. When the road surface pattern-rendering units 20 are rendering a specific light distribution pattern on the road surface in front of the vehicle V, the light sources 26 and the MEMS mirrors 36 of the left and right road surface pattern-rendering units 20 are driven under the control of the controller 28 so as to render a specific light distribution pattern on the road surface.

More specifically, the light source 26 of each surface pattern-rendering unit 20 is driven by the controller 28. Thus, the beam B shone from the light source 26 is reflected by the reflector 30, and is incident to the MEMS mirror 36. The controller 28 drives each movable micromirror of the mirror main body 36A of the MEMS mirror 36 so as to toggle each movable micromirror to the ON state or the OFF state corresponding to the light distribution pattern. Thus, when the beam B is incident to the mirror main body 36A, light corresponding to the light distribution pattern is reflected by the mirror main body 36A, passes through the lens 34, and is shone toward the front side. The light distribution pattern is accordingly formed by the road surface pattern-rendering units 20, and the light distribution pattern is rendered on the road surface.

Note that the ventilation fans 38 are provided inside the respective headlamp units 12R, 12L of the vehicle headlamps 10. The ventilation fans 38 blow air that is inside the respective headlamp units 12R, 12L toward the respective MEMS mirror 36 (more specifically, the movable micromirrors of the mirror main body 36A). More specifically, air above each ventilation fan 38 is blown toward the mirror main body 36A (downward) by the ventilation fan 38, and hits the movable micromirrors of the mirror main body 36A. Thus, even if dust adheres to the movable micromirrors of the mirror main body 36A, the dust is removed by the air blown by the ventilation fan 38. Accordingly, since scattering of ON beam B1 reflected by the mirror main body 36A is suppressed, excellent light distribution pattern formation can be achieved by the road surface pattern-rendering unit 20.

The ventilation fan 38 is disposed above, and in front of, the mirror main body 36A. The ventilation fan 38 blows air from above, and at the side, of the MEMS mirror 36 (mirror main body 36A) toward the mirror main body 36A. Thus, dust that has adhered to the movable micromirrors of die mirror main body 36A can be removed by the air that was blown across the front side of the mirror main body 36A by the ventilation fan 38, without disposing the ventilation fan 38 directly in front of the mirror main body 36A. Dust that has adhered to the movable micromirrors can accordingly be removed by the air blown by the ventilation fan 38, without obstructing the optical path of ON beam 131 reflected by the mirror main body 36A.

Since dust that has adhered to the movable micromirrors is removed by air blown by the ventilation fan 38, there is no need to dispose a transparent member in front of the MEMS mirror 36, as in the related art. ON beam B1 reflected by the MEMS mirror 36 (mirror main body 36A) can thereby be shone forward white suppressing loss of light from occurring due to the ON beam B1 passing through a transparent member.

The heatsink 24 of the light source unit 22 is disposed in the direction air is blown from the ventilation fan 38 so as to face the ventilation fan 38. Thus, the light source unit 22 (the heatsink 24) can be cooled utilizing the air that is blown by the ventilation fan 38. The heat dissipation effect of the heatsink 24 can accordingly be raised for the light source 26 and the ventilation tan 38 can thus be utilized as a cooling fan as well.

Moreover, the ventilation fans 38 are set by the controller 28 so as to run continuously during operation of the vehicle headlamps 10. Thus, air in each of the headlamp units 12R, 12L is constantly circulated during operation of the vehicle headlamps 10. Dust can accordingly be suppressed from collecting on (the upper faces of) the projecting faces 34A configuring the back surfaces of the lenses 34, and dust can be suppressed from adhering to the projecting faces 34A.

Note that in the first exemplary embodiment, the air blower that blows air toward the mirror main body 36A is configured as the ventilation fan 38; however, the configuration of the air blower is not limited thereto. For example, the air blower may be a blower including plural fins.

In the first exemplary embodiment, the ventilation fan 38 is disposed above the mirror main body 36A; however, the position where the ventilation fan 38 is set may be modified as appropriate. For example, the ventilation fan 38 may be disposed at the lower side, the right side, or the left side of the mirror main body 36A.

In the first exemplary embodiment, the heatsink 24 (light source unit 22) is disposed in the direction air is blown from the ventilation fan 38 so as to face the ventilation fan 38. However, the position of the light source unit 22 may be modified depending on the type of vehicle, as appropriate. For example, configuration may be made in which the entire light source unit 22 is offset to the rear with respect to its placement position in the first exemplary embodiment, and air blown by the ventilation fan 38 blows toward the light source 26.

In the first exemplary embodiment, the ventilation fans 38 are set by the controller 28 so as to run continuously during operation of the vehicle headlamps 10; however, the operation timing of the ventilation fans 38 may be modified as appropriate. For example, the ventilation fans 38 may be set so as to run for a specific duration each time, or the ventilation fans 38 may be set so as to run during operation of the road surface pattern-rendering unit 20.

Second Exemplary Embodiment

Figure 3:
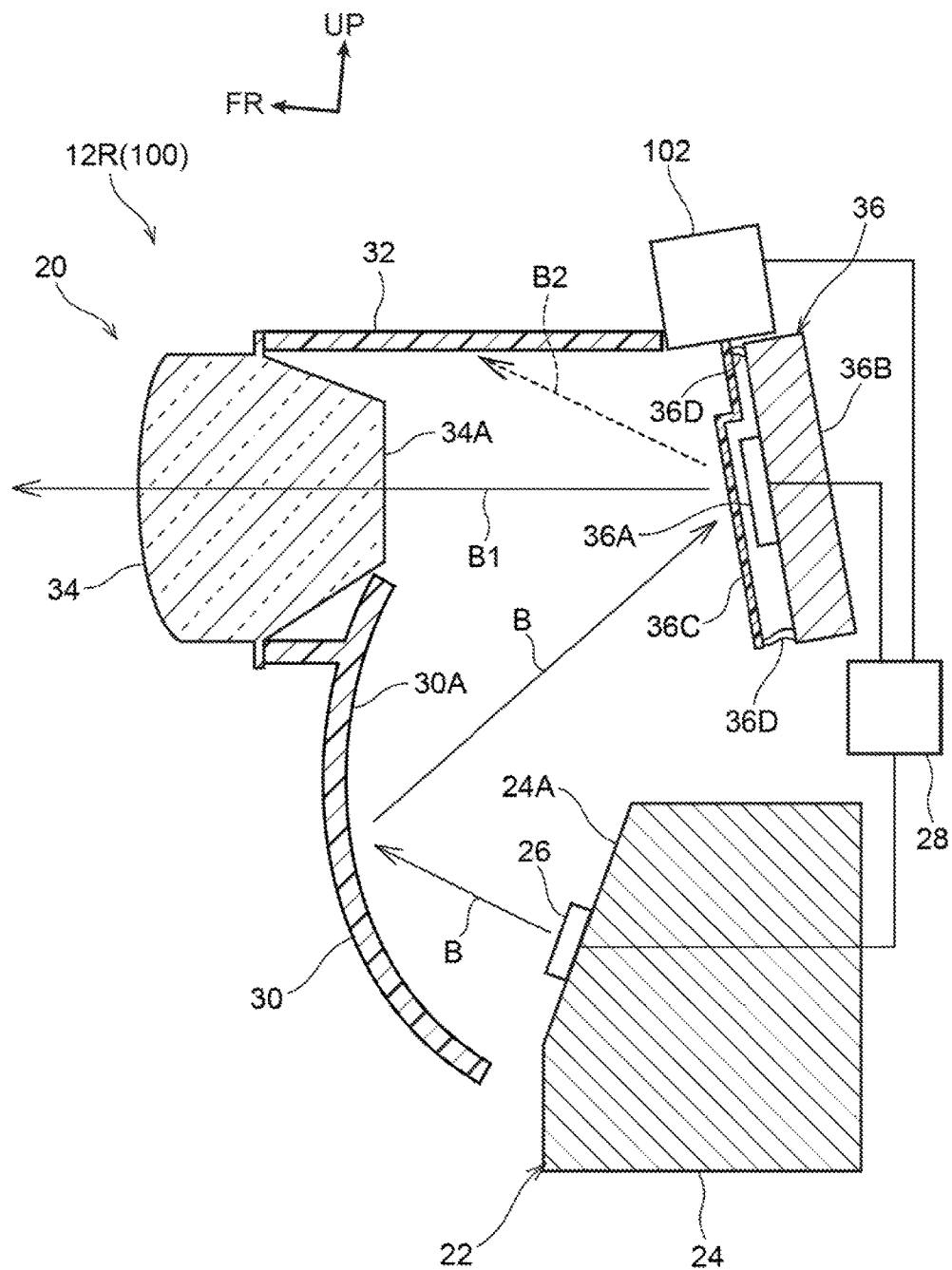
FIG. 3 is a side cross-section corresponding to FIG. 1 illustrating a road surface pattern-rendering unit of a vehicle headlamp according to a second exemplary embodiment.

Explanation follows regarding vehicle headlamps 100 of a second exemplary embodiment, with reference to FIG. 3. Configuration of the second exemplary embodiment is similar to that of the first exemplary embodiment with the exception of the following points. Note that in FIG. 3, members with similar configuration as those of the first exemplary embodiment are appended with the same reference numerals.

Namely, in the second exemplary embodiment, the MEMS mirror 38 includes a transparent cover 36C that covers the mirror main body 36A from the front side. The front end portion of the MEMS mirror 36 is accordingly configured by the cover 36C. The cover 36C is, for example, configured by a resin member, and is formed with a sheet shape having a relatively thin sheet thickness. The cover 36C is disposed close to the front side of the mirror main body 36A with its thickness direction substantially along the front-rear direction (more specifically, so as to be parallel to the mirror main body 36A). A frame shaped sealing member 36D having elastic properties is provided between an outer peripheral portion of the cover 36C and the support, portion 36B. The sealing member 36D couples both the cover 36C and the support portion 36B together in a sealed state. The cover 36C is accordingly configured capable of displacing in the vertical direction due to the sealing member 36D undergoing elastic deformation in the vertical direction. A state is adopted in which the space between the cover 36C and the support portion 36B is tightly sealed by the sealing member 36D, and the mirror main body 36A is disposed inside this space. Moreover, a portion at an upper end side of the cover 36C is bent toward the rear in a substantially crank shape in side view, so as to follow the shape of the mirror main body 36A.

In the second exemplary embodiment, vibrating actuators 102, which serve as "vibrators" and are respectively configured by a piezoelectric element or the like, are provided inside the headlamp units 12R, 12L of the vehicle headlamps 100, and the ventilation fans 38 of the first exemplary embodiment are not provided. Each vibrating actuator 102 is disposed above the MEMS mirror 36 (more specifically, at the opposite side of the MEMS mirror the light source unit 22), and is fixed to the lens holder 32 through a bracket or the like, not illustrated in the drawings. The upper end portion of the cover 36C is coupled to the vibrating actuator 102.

Moreover, the vibrating actuator 102 is electrically connected to the controller 28, and configuration is made in the vibrating actuator 102 operates under control of the controller 28. More specifically, configuration is made such that the cover 36C vibrates in a simple harmonic motion in the vertical direction when the vibrating actuator 102 operates. Note that in the second exemplary embodiment, operation of the vibrating actuators 102 is also set by the controller 28 so as to be initiated when operation of the vehicle headlamps 100 is initiated by occupant operation. Moreover, operation of the vibrating actuators 102 is set by the controller 28 so as to be stopped when operation of the vehicle headlamps 100 is stopped by occupant operation. Namely, ire the second exemplary embodiment, the vibrating actuators 102 are also set so as to run continuously during operation of the vehicle headlamps 100.

Dust adhered to a front face of the cover 36C (front face of the MEMS mirror 36) is knocked downward when each of the vibrating actuators 102 is operated by the controller 28. Accordingly, by vibrating the cover 36C using the vibrating actuator 102, dust that has adhered to the front face of the MEMS mirror 36 can be removed in the second exemplary embodiment as well. Accordingly, since scattering of ON beam B1 reflected by the mirror main body 36A is suppressed, excellent light distribution pattern formation can be achieved by the road surface pattern-rendering unit 20 in the second exemplary embodiment as well.

Moreover, in the second exemplary embodiment, the mirror main body 36A of the MEMS mirror 36 is covered from the front by the cover 36C. Thus, dust can be prevented from adhering directly to the mirror main body 36A.

Moreover, in the second exemplary embodiment, the upper end portion of the cover 36C is coupled to the vibrating actuator 102. Thus, dust that has adhered to the cover 36C can be easily knocked off to below the cover 36C. Compared to a hypothetical case in which the vibrating actuator 102 is disposed below the MS mirror 36, dust that has beet knocked downward from the cover 36C can thereby suppressed from collecting on the vibrating actuator 102.

Moreover, in the second exemplary embodiment, the vibrating actuator 102 is disposed above the MEMS mirror 36, in other words, the light source unit 22 (the light source 26 and the heatsink 24) is disposed at the opposite side of the MEMS mirror 36 to the vibrating actuator 102. Thus, the separation distance between the light source unit 22 (the light source 26 and the heatsink 24) and the vibrating actuator 102 can be made longer than in a comparative example in which the vibrating actuator 102 is disposed between the MEMS mirror 36 and the heatsink 24. Vibration generated by the vibrating actuator 102 is accordingly less liable to be transmitted to the light source unit 22 (the light source 26 and the heatsink 24) than in the comparative example above. Accordingly, compared to the comparative example above, the beam B shone from the light source 26 can be suppressed from shaking.

Moreover, in the second exemplary embodiment, speckling (a phenomenon in which a spotted pattern occurs) in the light distribution pattern that occurs when the light source 26 is configured by a semiconductor laser can be reduced. Namely, a laser beam shines from the light source 26 in cases in which the light, source 26 is configured by a semiconductor laser. Due to this laser beam being coherent light, speckling occurs in the light distribution pattern rendered on the road surface with the laser beam. By contrast, in the second exemplary embodiment, the transparent cover 36C at the front side of the mirror main body 36A is caused to vibrate by the vibrating actuator 102. To address the above speckling, it is known that speckling is reduced by vibrating a light diffusion sheet, a lens, or the like through which the laser beam has passed. Speckling in the light distribution pattern can accordingly be reduced by vibrating the cover 36C at a specific frequency.

Moreover, in the second exemplary embodiment, the vibrating actuator 102 causes the cover 36C to vibrate in the vertical direction, thereby removing dust that has adhered to the cover 36C. Thus, interference of the cover 36C with the mirror main body 36A when the cover 36C is vibrating can be suppressed due to the vibration amplitude of the cover 36C being in the vertical direction.

Note that, in the second exemplary embodiment, there are no particular limitations to the vibration frequency of the vibrating actuator 102, and the vibration frequency may be modified as appropriate. For example, the vibration frequency may be matched to the natural frequency of the cover 36C. This thereby enables dust that has adhered to the cover 36C to be effectively removed. As explained above, the frequency may also be set so as to reduce speckling in the light distribution pattern.

Moreover, although the vibration by the vibrating actuator 102 is a vibration of a simple harmonic motion in the vertical direction, the vibration may be a random vibration such as in white noise. For example, in cases in which the vibration is white noise random vibration, the random vibration includes a wide range of frequencies, and so dust that has adhered to the cover 36C can be efficiently removed.

Moreover, although in the second exemplary embodiment, the vibrating actuator 102 is set by the controller 28 so as to run continuously during operation of the vehicle headlamp 100, the operation timing of the vibrating actuator 102 may be modified as appropriate. For example, the vibrating actuator 102 may be set to be caused to run for a specific duration each time, and the ventilation fan 38 may be set to be caused to run during operation of the road surface pattern-rendering unit 20.

Moreover, in the second exemplary embodiment, the vibrating actuator 102 is disposed above the MEMS mirror 36; however, the vibrating actuator 102 may be disposed at a position at the lower side, the right side, or the left side of the MEMS mirror 36.

What is claimed is:

1. A vehicle headlamp comprising:
    a road surface pattern-rendering unit that is installed to a headlamp unit, the headlamp unit being provided to a front end section of a vehicle and the road surface pattern-rendering unit forming a specific light distribution pattern by causing light shone from a light source to be reflected by a MEMS mirror toward a vehicle front side; and
    a dust removal device that is provided to the headlamp unit, the dust removal device removing dust adhering to the MEMS mirror, wherein
    the MEMs mirror includes a support portion including a front face to which a mirror main body is fixed, the mirror main body reflecting the light;
    the dust removal device includes an air blower that blows air directed toward the MEMS mirror, the air blower being above and perpendicular to the support portion;
    the road surface pattern-rendering unit includes a light source unit including a light source and a heatsink that holds the light source; and
    the light source unit is disposed below the MEMS mirror in a direction air is blown from the air blower so as to face the air blower.

2. The vehicle headlamp of claim 1, wherein the air blower is configured as a ventilation fan or a blower including plural fins.

3. The vehicle headlamp of claim 1, wherein the MEMS mirror reflects the light through a lens and the air blower is attached to a lens holder that holds the lens.

4. A vehicle headlamp comprising:
    a road surface pattern-rendering unit that is installed to a headlamp unit, the headlamp unit being provided to a front end section of a vehicle and the road surface pattern-rendering unit forming a specific light distribution pattern by causing light shone from a light source to be reflected by a MEMS mirror toward a vehicle front side; and a dust removal device that is provided to the headlamp unit, the dust removal device removing dust adhering to the MEMS mirror, wherein the MEMS mirror includes a mirror main body that reflects light shone from the light source, a support portion attached to a rear side of the mirror main body, a transparent cover that covers the mirror main body from the vehicle front side, and a sealing member that elastically couples the cover to the support portion;

the dust removal device is configured by a vibrator above the support portion that causes the cover to vibrate;

the road surface pattern-rendering unit includes a light source unit including a light source and a heatsink that holds the light source; and the light source unit is disposed below the MEMS mirror opposite the vibrator.

5. The vehicle headlamp of claim 4, wherein an upper end portion of the cover is coupled to the vibrator.

6. The vehicle headlamp of claim 4, wherein a vibration frequency of the vibrator is matched to a natural frequency of the cover.

7. The vehicle headlamp of claim 4, wherein a vibration frequency of the vibrator is set to a specific frequency that reduces speckling in the specific light distribution pattern.

8. The vehicle headlamp of claim 4, wherein the vibrator vibrates with a simple harmonic motion in a vertical direction.

9. The vehicle headlamp of claim 4, wherein the vibrator vibrates with a random vibration.

* * * * *